UNITED STATES PATENT OFFICE.

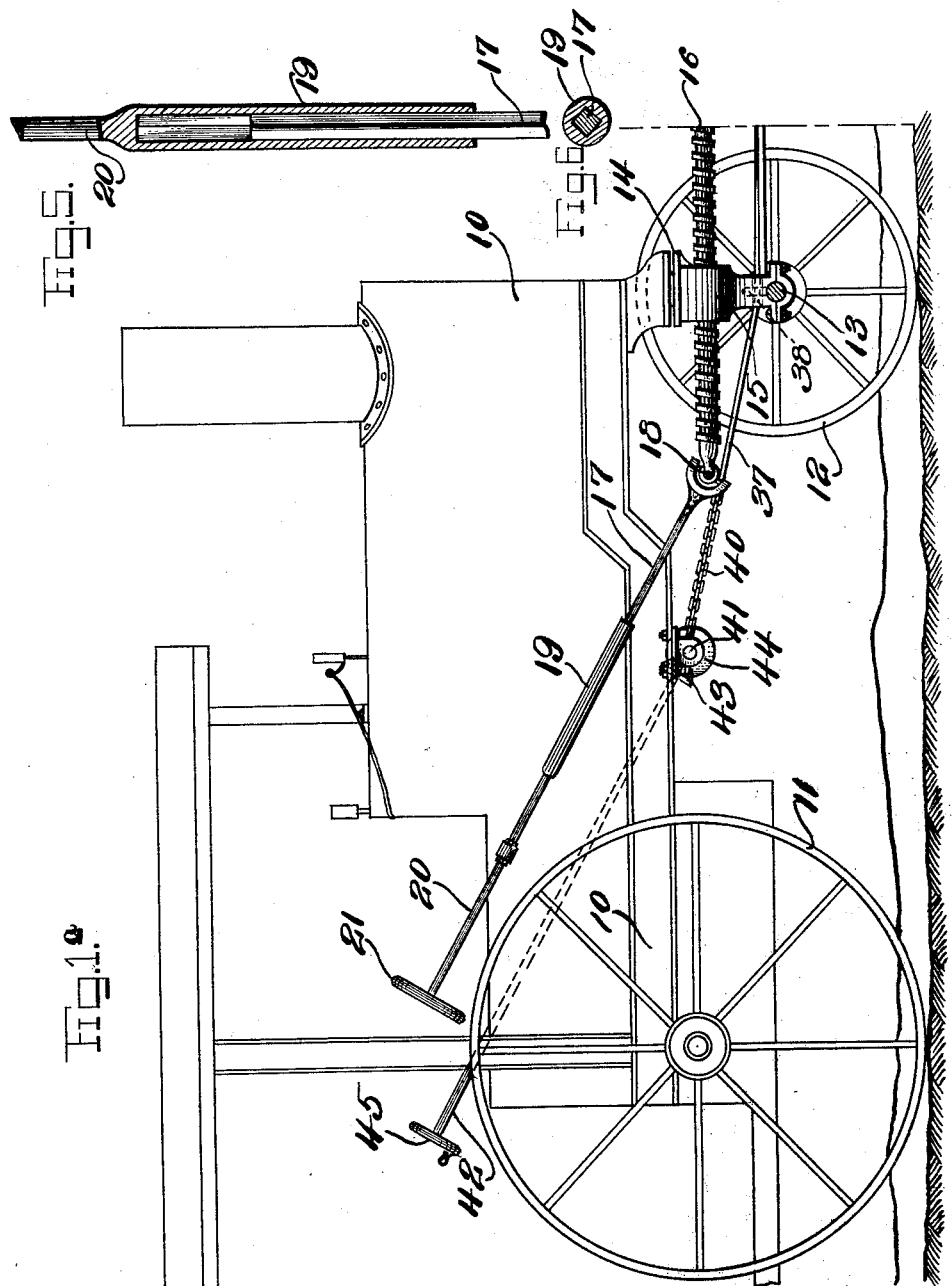

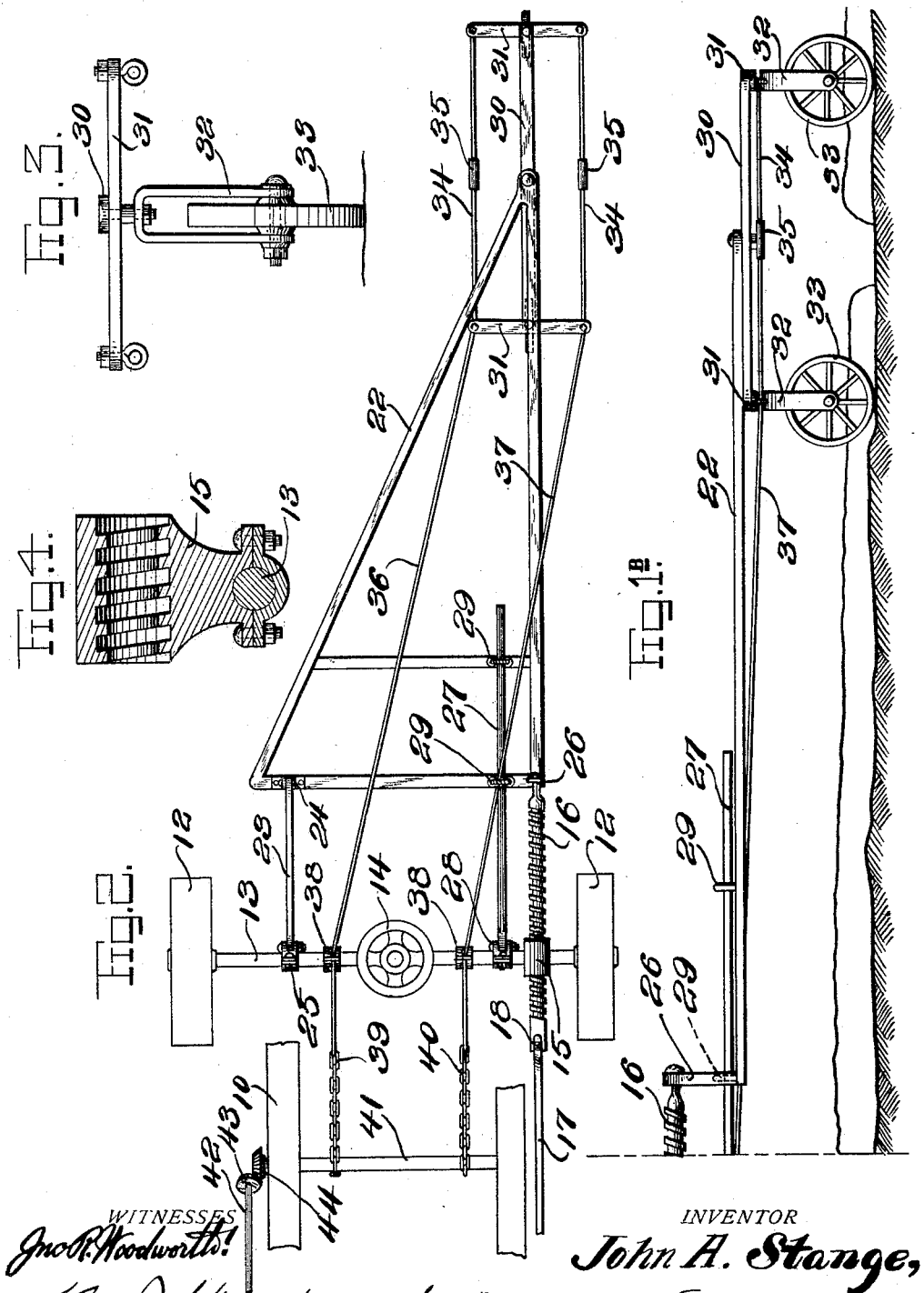

JOHN A. STANGE, OF REGENT, NORTH DAKOTA.

STEERING-GUIDE.

1,105,107.  Specification of Letters Patent.  Patented July 28, 1914.

Application filed April 29, 1913. Serial No. 764,380.

*To all whom it may concern:*

Be it known that I, JOHN A. STANGE, citizen of the United States, residing at Regent, in the county of Hettinger and State of North Dakota, have invented certain new and useful Improvements in Steering-Guides, of which the following is a specification, reference being had therein to the accompanying drawing.

This invention relates to a traction engine, and the principal object of the invention is to provide a construction which will permit the traction engine to be guided and prevented from getting out of alinement with the furrow formed by a plow drawn by the traction engine.

Another object of the invention is to so construct the guiding means that there is no danger of the supporting wheels riding out of the furrow in case there is a break in the furrow.

Another object of the invention is to provide a construction which will permit the traction engine to be turned when desired and also permit the supporting wheels of the guiding device to be turned independent of the guiding axle for the traction engine.

Another object of the invention is to so construct the guiding device that the turning of the traction engine axle will cause the guiding device to be swung upon a pivot.

With these and other objects in view this invention consists of certain novel combinations, constructions, and arrangements of parts as will be hereinafter fully described and claimed.

In the accompanying drawing:—Figure 1ª is a side elevation of the traction engine. Fig. 1ᵇ is a side elevation of the guiding means and forms a continuation of Fig. 1ª. Fig. 2 is a top plan view of the guiding means and the forward end portion of the traction engine. Fig. 3 is a fragmentary elevational view of one of the supporting wheels of the guiding device, together with its operating mechanism. Fig. 4 is a sectional view through the bur mounted upon the guiding axle of the traction engine. Fig. 5 is a fragmentary sectional view through the operating handle with the sliding stem mounted therein. Fig. 6 is a transverse section through the operating handle.

In the accompanying drawings the numeral 10 designates the body portion of the traction engine which is provided with the rear wheels 11 and the forward wheels 12 mounted upon the axle 13 which carries the fifth wheels 14. A bur 15 is secured to one side portion of the axle 13 and carries a threaded shaft 16 having its inner end connected with the square stem 17 by means of the universal joint 18. This stem 17 is slidably mounted in the hollow lower end portion 19 of the operating handle 20, thus permitting the stem to slide in the handle so that when the axle 13 is turned, the stem may accommodate itself to the length of space between the universal joint and the end of the handle. When the handle is turned by means of the member 21 the shaft 16 is rotated and this will cause the axle 13 to be turned to guide the traction engine.

A triangular frame 22 is positioned in front of the traction engine and has one side connected with the axle 13 by means of the rod 23 pivotally secured to the frame and axle by means of the bearings 24 and 25. The opposite side portion of the frame is provided with an upwardly extending lug 26 with which the shaft 16 is rotatably connected as shown in Fig. 1ᵇ to cause the frame to be swung when the shaft 16 is rotated. A guiding rod 27 is connected with the axle 13 by means of the bearing 28 and passes through the guiding eyes 29 to guide the pivotal movement of the frame.

A carriage is pivotally connected with the forward end of the frame 22 and comprises the longitudinally extending bar 30 with which the cross bars 31 forming handles are pivotally connected. The forks 32 which carry the supporting wheels 33 are connected with the guiding handles 31 and the guiding handles are connected by the rods 34 which are tightened by the threaded sleeves 35. Lines 36 and 37 extend from the rear guiding arm 31 and pass through eyes 38 mounted upon the axle 13. The inner ends of the lines 36 and 37 are connected with chains 39 and 40 which chains are oppositely wound upon the shaft 41 rotatably connected with the frame of the traction engine and constituting a drum. A shaft 42 has its beveled gear 43 meshing with the beveled gear 44 of the shaft 41 and it will thus be seen that when the wheel 45 is rotated the shaft 41 will be turned to release the lines 36 or 37 and to draw the remaining line, thus turning the supporting wheels of the carriage to guide the frame. When this engine is in use the supporting wheels 33 travel in the furrow and the traction engine is positioned with the wheels at one side traveling upon the unplowed land and the wheels at the other side traveling upon the plowed land. As the supporting wheels 33 travel through the furrow they are liable to strike a break in the unplowed portion of the land which would be liable to throw the guiding wheels from the furrow, thus causing the traction engine to be guided away from the unplowed land. This is prevented due to the fact that two wheels 33 have been provided thereby causing the rear wheel to hold the front wheel in place until the break is passed and the front wheel to then prevent the rear wheel from passing out through the break. When it is desired to guide the engine a small amount the wheel 45 may be rotated in the proper direction and this will cause the wheels 33 to be turned, thus guiding the frame and causing the engine to be drawn to one side. The frame is permitted to have a slight pivotal movement due to the fact that the neck of the shaft 16 upon which the lug 26 is mounted is of sufficient length to permit the lug to have a sliding movement. When it is desired to turn the traction engine a great amount the wheel 21 is rotated and this will rotate the threaded shaft 16 to turn the axle, thus bringing the axle at one side nearer to or farther away from the frame. In order to permit the relative position of the frame and axle to be changed the frame must be slidably mounted upon the guiding rod 27 and the stem 17 must be slidably mounted as shown in Fig. 5. When the axle 13 is turned the wheels 33 must also be turned to assist in turning the engine. By this construction the traction engine may be kept straight while plowing and also may be readily guided when traveling along the road from one place to another.

Having thus described the invention what is claimed as new, is:—

1. A traction engine, a frame positioned in front of said traction engine, means for pivotally connecting one side of said frame with one end portion of the guiding axle of said traction engine, means for slidably connecting the opposite side portion of said frame with the opposite end portion of said axle, a threaded bur carried by said axle, a threaded shaft passing through said bur and rotatably connected with the slidably mounted side of said frame, a carriage pivotally connected with said frame and provided with supporting wheels, means for rotating said threaded shaft, and means for turning the supporting wheels of said carriage.

2. A traction engine provided with a guiding axle, a frame positioned in front of said traction engine, a rod pivotally connecting one side of said frame with one end portion of said axle, a second rod pivotally connected with the opposite end portion of said axle and slidably connected with the opposite side portion of said frame, a bur carried by said axle, a threaded shaft passing through said bur and having its outer end rotatably connected with said frame, pivotally mounted supporting wheels connected with said frame, means for rotating said threaded shaft, and means for guiding said supporting wheels.

3. A traction engine, a frame positioned in front of said traction engine, means for pivotally connecting one side portion of said frame with one end portion of the guiding axle of said engine, guiding means for said frame and axle engaging the opposite side portion of said frame and the opposite end portion of said axle, a rod extending from said axle and slidably connected with said frame, guiding wheels connected with said frame, and means for controlling said guiding wheels.

In testimony whereof I hereunto affix my signature in presence of two witnesses.

JOHN A. STANGE.

Witnesses:
 PETER ERICKSON,
 JOHN PETERS.